UNITED STATES PATENT OFFICE.

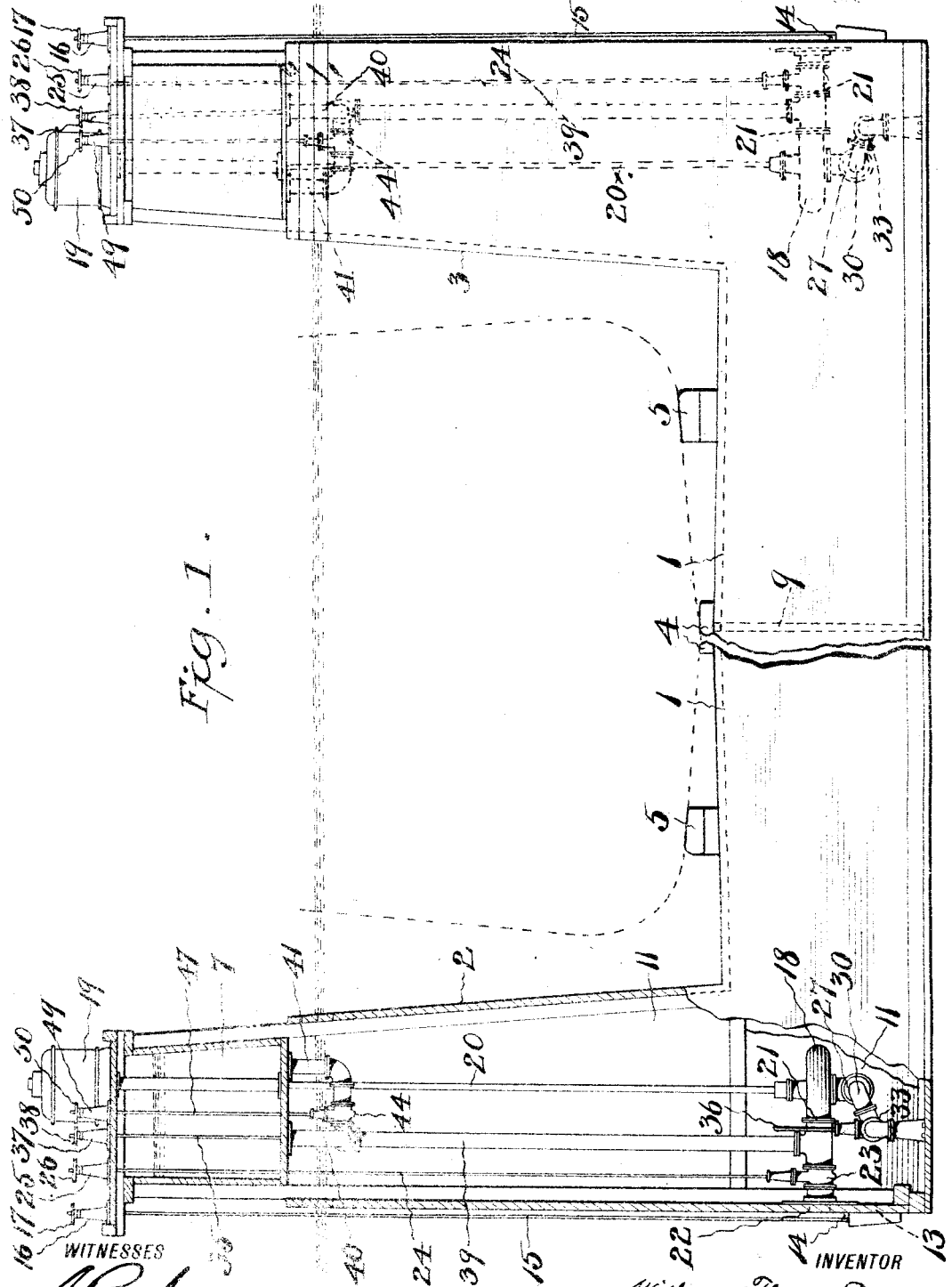

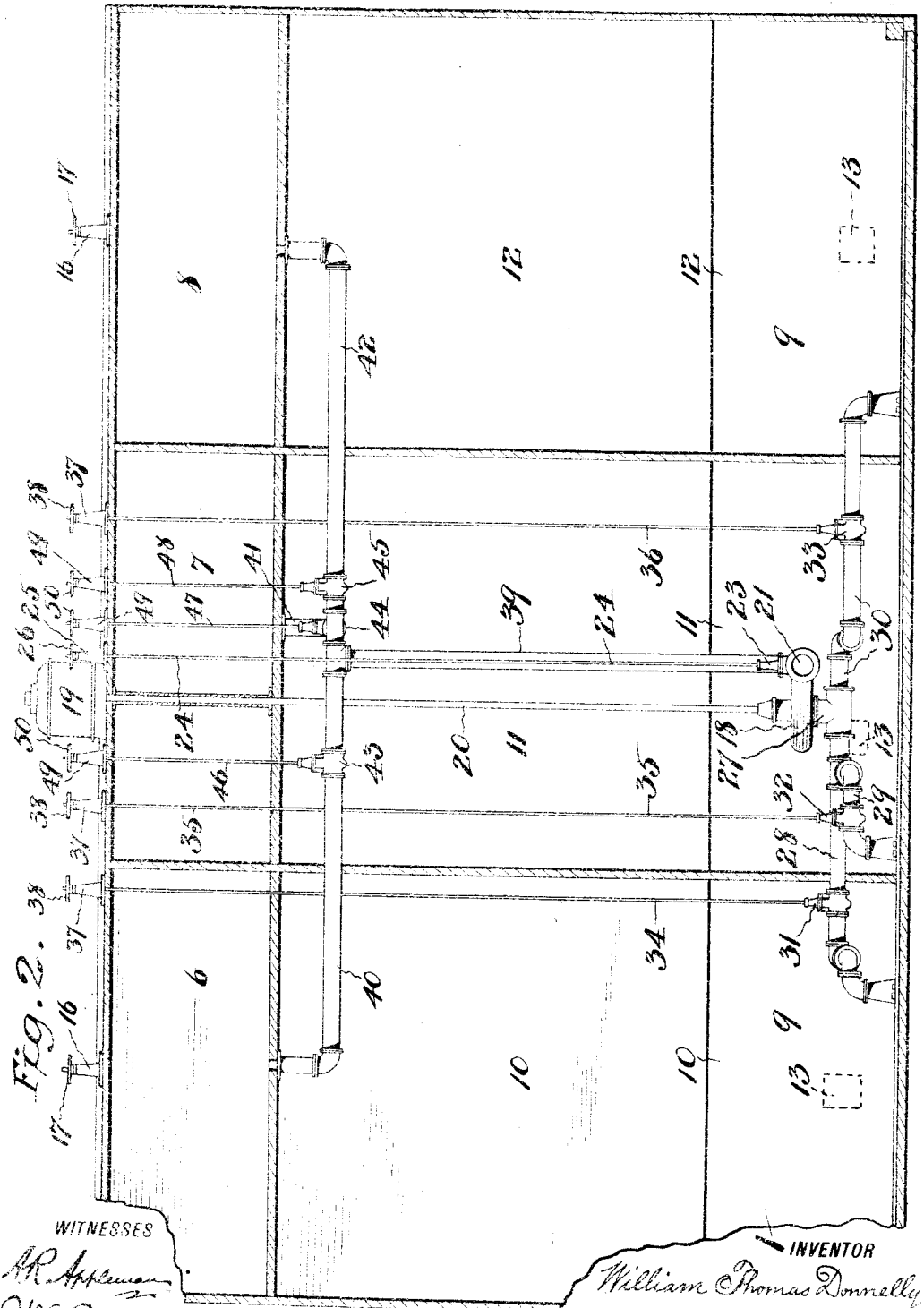

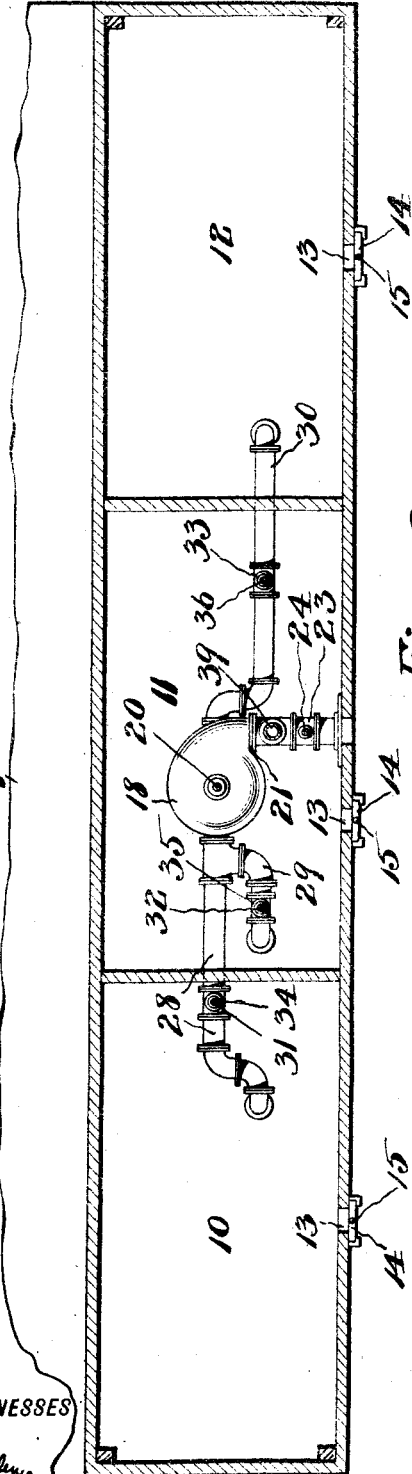

WILLIAM THOMAS DONNELLY, OF BROOKLYN, NEW YORK.

FLOATING DRY-DOCK 1,107,768.        Specification of Letters Patent.      Patented Aug. 18, 1914.

Application filed October 9, 1912. Serial No. 724,888.

*To all whom it may concern:*

Be it known that I, WILLIAM THOMAS DONNELLY, a citizen of the United States, residing at Brooklyn, in the county of Kings and State of New York, have invented certain new and useful Improvements in Floating Dry-Docks, of which the following is a specification.

My invention relates to floating dry docks. In floating dry docks constructed of wood or principally of wood, it has been necessary to place solid permanent ballast therein, for instance stone, to sink them, this being for the reason that the weight of a dock of this character, even with the aid of the water admitted therein, is less than the weight of the water which it displaces, and to provide room therein for the solid ballast the dimensions of the dock have to be increased beyond those necessitated by the size of the largest vessel which it is required to dock.

My invention therefore has for its object to provide a floating dry dock constructed of wood or principally of wood, having means whereby ballast, for instance water, may be supplied thereto at a point above the extreme draft of the dock to aid in sinking it and readily withdrawn therefrom to allow the dock to rise, thereby obviating the necessity of increasing the dimensions of a dock of this character beyond those absolutely necessitated by the size of the largest vessel which it is required to dock.

It has for a further object to provide a floating dry dock constructed of wood or principally of wood having means whereby it can be trimmed and thus kept level, this object being accomplished by providing a series of water compartments in the dock, a series of water compartments at a point above the extreme draft of the dock and means adapting water to pass back and forth between said compartments and adapting water to be exhausted from said compartments.

In the drawings: Figure 1 is an end view of the dock embodying my invention, shown partly in section and broken away. Fig. 2 a longitudinal vertical sectional view, taken through the body of the dock, one of the wings and the ballast compartments on top of said wing. Fig. 3 a horizontal sectional view, taken through the ballast compartments on top of one of the wings and showing the bottom of the middle ballast compartment partly broken away. Fig. 4 a horizontal sectional view, taken through one of the wings.

Referring to the drawings illustrating my invention, in which like reference characters designate corresponding parts, 1 designates the body of the dock and 2 and 3 the wings thereof. Keel blocks 4 and bilge blocks 5 are provided upon the deck of the dock for receiving and supporting a vessel thereon. Ballast compartments 6, 7, and 8 are provided on top of the wings above the extreme draft of the dock and by reason of their location, in addition to serving the purposes herein before and herein after fully set forth, offer no resistance to the sinking of the dock.

The body of the dock is divided interiorly by a central longitudinal bulkhead 9 and the body on each side of the bulkhead and each wing is divided interiorly into ballast compartments 10, 11 and 12 having lateral inlets 13 controlled by gates 14 operated by rods 15, the lower ends of which are secured to the gates and the upper ends provided with screw threads and passing through stands 16, on top of the ballast compartments 6, 7 and 8, and engaging screw threaded bores in hand wheels 17.

Centrifugal pumps 18 are mounted in the ballast compartments 11 of the dock and operated by motors 19, on top of the ballast compartments 6, 7 and 8, connected by shafts 20 with the wheels of the pumps. The pumps are provided with laterally extending outlets 21 connected with outlets 22, to the exterior of the dock, controlled by valves 23 operated by shafts 24, the lower ends of which are secured to the valves and the upper ends provided with screw threads and passing through stands 25 on the top of the ballast compartments 6, 7 and 8, and engaging screw threaded bores in the hand wheels 26. Combined inlets and outlets 27, to and from the pumps, extend downwardly therefrom and are connected with the ballast compartments 10, 11 and 12 by pipes 28, 29 and 30 respectively having suction bells on their ends and provided with suction valves 31, 32 and 33 respectively controlling the passage of water therethrough and operated by shafts 34, 35 and 36 respectively the lower ends of which are connected to the valves and the upper ends provided with screw threads and passing through stands 37 on top of the ballast compartments 6, 7 and 8 and engaging screw threaded bores in hand wheels 38. Pipes 39 are connected at their lower ends with the outlets 21 from the pumps and at their upper ends with pipes 40, 41 and 42 connected with the ballast compartments 6, 7 and 8 respectively and provided with valves 43, 44 and 45 respectively controlling the passage of water therethrough and operated by shafts 46, 47 and 48 respectively the lower ends of which are connected to the valves and the upper ends provided with screw threads and passing through stands 49 on top of the ballast compartments 6, 7 and 8 and engaging screw threaded bores in hand wheels 50.

The operation is as follows:

The dock being assumed to be raised and ready to be sunk, with the keel and bilge blocks properly adjusted for the vessel to be docked, the flood gates 14 along both sides of the dock are opened, the valves 43, 44 and 45 opened, the outlet valves 23 closed, the suction valves 31, 32 and 33 opened and the pumps 18 are started, whereupon water will flow into the compartments 10, 11 and 12 and be forced therefrom by the pumps into the compartments 6, 7 and 8 and after the dock has sunk to the required depth the flood gates 14 are closed, the pumps 18 stopped, the valves 43, 44 and 45 are closed and the vessel to be docked is then centered therein. After the dock has been sunk it can be trimmed both laterally and longitudinally so as to be perfectly level. The dock is trimmed longitudinally, in one direction, by opening the valves 43 and the suction valves 33 and allowing water to run from the compartments 6 into the compartments 12, or longitudinally in the opposite direction by opening the valves 45 and the suction valves 31 and allowing water to run from the compartments 8 into the compartments 10. The dock is trimmed laterally, in one direction, by opening the valves 23 of the pumps 18 and opening the valves 43, 44 and 45 of the compartments 6, 7 and 8 on the side of the dock having the wing 2 and allowing water to run from the compartments 6, 7 and 8 through the outlets 22 of the dock, or trimmed laterally in the opposite direction by opening the valves 23 of the pumps 18 and opening the valves 43, 44 and 45 of the compartments 6, 7 and 8 on the side of the dock having the wing 3 and allowing water to run from the compartments 6, 7 and 8 through the outlets 22 of the dock. To raise the dock again, with the ship thereon, the valves 43, 44 and 45 are opened and the valves 23 of the pumps 18 opened, whereupon the water in the compartments 6, 7 and 8 will exhaust therefrom by gravity and pass out through the outlets 22 of the dock and thereafter water is also exhausted from the compartments 10, 11 and 12 by opening the suction valves 31, 32 and 33 and starting the pumps 18, whereupon the water in the compartments 10, 11 and 12 will be forced therefrom by the pumps 18 and pass out through the outlets 22 of the dock.

I do not wish to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

I claim:

1. A floating dry dock constructed substantially of wood, having ballast compartments which under all conditions are located at a point entirely above the line of its extreme draft, means forming a communication between said compartments, adapting liquid ballast to be supplied thereto and withdrawn therefrom, and pumping means for forcing said liquid ballast into said compartments, substantially as described.

2. A floating dry dock constructed substantially of wood, having lower ballast compartments, ballast compartments which under all conditions are located on each side at a point entirely above the line of extreme draft and the lower ballast compartments and means adapting liquid ballast to be supplied from the lower to the upper compartments and withdrawn therefrom, substantially as described.

3. A floating dry dock constructed substantially of wood, having lower ballast compartments, upper ballast compartments which under all conditions are located at a point entirely above its extreme draft and the lower ballast compartments and means adapting liquid ballast to be supplied thereto and withdrawn therefrom and adapting liquid ballast to pass back and forth from the lower to the upper compartments, substantially as described.

4. A floating dry dock constructed substantially of wood, having compartments which under all conditions are located at the top on each side at a point entirely above the line of its extreme draft, means adapting liquid ballast to be supplied to said compartments and the lower portion of the interior of the dock and pass back and forth between said compartments and the lower portion of the interior of the dock and means adapting liquid ballast to be withdrawn from said compartments and the lower portion of the interior of the dock independently, substantially as described.

5. A floating dry dock constructed substantially of wood, having compartments in the lower portion of its interior, compartments which under all conditions are located at the top at a point entirely above its extreme draft, means adapting liquid ballast to be supplied to said compartments and means adapting liquid ballast to be withdrawn from said compartments located at the top above the extreme draft of the dock and the compartments in the lower portion of the interior of the dock independently, substantially as described.

6. A floating dry dock constructed substantially of wood, having upper and lower compartments in its interior, the upper compartments under all conditions being located at a point entirely above its extreme draft, means adapting liquid ballast to be supplied to said compartments and pass back and forth between said compartments and means adapting liquid ballast to be withdrawn from the compartments located above the extreme draft of the dock and the lower compartments in the dock independently, substantially as described.

7. A floating dry dock constructed substantially of wood, having lower compartments in its interior, upper compartments which under all conditions are located on each side at a point entirely above its extreme draft, means adapting liquid ballast to be supplied to the compartments above the extreme draft and means adapting liquid ballast to be withdrawn from the upper compartments located above the extreme draft and the lower compartments in the interior of the dock independently, substantially as described.

In testimony whereof I have signed my name in the presence of two subscribing witnesses.

WILLIAM THOMAS DONNELLY.

Witnesses:
FREDERICK W. QUIDAS,
GUNWAR C. ENGSTRAND.

Copies of this patent may be obtained for five cents each, by addressing the "Commissioner of Patents, Washington, D. C."